United States Patent
Nishita (10) Patent No.: US 9,605,957 B2
(45) Date of Patent: Mar. 28, 2017

(54) SURVEYING INSTRUMENT AND METHOD TO INSTALL SURVEYING INSTRUMENT

(71) Applicant: Kabushiki Kaisha TOPCON, Tokyo-to (JP)

(72) Inventor: Nobuyuki Nishita, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 65 days.

(21) Appl. No.: 14/840,595

(22) Filed: Aug. 31, 2015

(65) Prior Publication Data

US 2016/0076885 A1     Mar. 17, 2016

(30) Foreign Application Priority Data

Sep. 17, 2014   (JP) .................................. 2014-189197

(51) Int. Cl.
*G01C 5/00* (2006.01)
*G01C 25/00* (2006.01)
(Continued)

(52) U.S. Cl.
CPC ............. *G01C 5/00* (2013.01); *G01C 15/008* (2013.01); *G01C 15/105* (2013.01); *G01C 25/005* (2013.01)

(58) Field of Classification Search
CPC ........ G01C 5/00; G01C 15/00; G01C 15/008; G01C 15/105; G01C 25/005
(Continued)

(56) References Cited

U.S. PATENT DOCUMENTS

2015/0092180 A1*   4/2015   Nishita .................... G01C 1/04
                                                356/4.01
2015/0098075 A1*   4/2015   Bestler ................. G01C 15/002
                                                356/3.01
(Continued)

FOREIGN PATENT DOCUMENTS

EP     1174682 A2    1/2002
EP     1211484 A2    6/2002
(Continued)

OTHER PUBLICATIONS

European communication dated Feb. 17, 2016 in corresponding European patent application No. 15184740.7.

*Primary Examiner* — Yaritza Guadalupe-McCall
(74) *Attorney, Agent, or Firm* — Nields, Lemack & Frame, LLC (57) ABSTRACT

The invention provides a surveying instrument, which comprises a surveying instrument main unit having a machine reference point already known, a telescope unit installed on the surveying instrument main unit and for sighting a measuring point, a leveling unit for leveling the surveying instrument main unit, a laser pointer projecting unit for projecting a laser pointer beam in a downward direction along a vertical axis of the surveying instrument main unit and for performing distance measurement, a rotation driving unit for rotating the telescope unit in a direction as desired, a horizontal angle detecting unit for detecting a horizontal angle of the surveying instrument, main unit, a vertical angle detecting unit for detecting a vertical angle of the telescope unit, a tilt angle detecting unit for detecting a tilt angle of the surveying instrument main unit, and a control device, wherein the control device calculates relative space coordinates of the machine reference point of the surveying instrument main unit with respect to a projecting point of the laser pointer beam based on a distance measurement value (Continued)

obtained by the laser pointer projecting unit and on a tilt angle at the time of distance measurement.

7 Claims, 5 Drawing Sheets

(51) Int. Cl.
  *G01C 15/00* (2006.01)
  *G01C 15/10* (2006.01)
(58) Field of Classification Search
  USPC .......................................................... 33/292
  See application file for complete search history.

(56) References Cited

U.S. PATENT DOCUMENTS

2015/0354954 A1* 12/2015 Nishita ................ G01C 15/002
  33/292
2016/0061595 A1* 3/2016 Nishita ................... G01C 9/20
  356/152.2
2016/0076885 A1* 3/2016 Nishita ................ G01C 15/008
  33/292
2016/0216110 A1* 7/2016 Nishita ................... G01C 3/08

FOREIGN PATENT DOCUMENTS

| EP | 2096405 A1 | 9/2009 |
| JP | 2-55113 U | 4/1990 |
| JP | 3008293 B2 | 2/2000 |
| JP | 3179582 B2 | 6/2001 |
| WO | 2006/074768 A1 | 7/2006 |

\* cited by examiner

SURVEYING INSTRUMENT AND METHOD TO INSTALL SURVEYING INSTRUMENT

BACKGROUND OF THE INVENTION

The present invention relates to a surveying instrument, which can be easily installed at a reference position, and to a method to install, the surveying instrument.

In a conventional type surveying instrument, a measurement is carried out from a reference point already determined such as a reference point pile or the like. At the time of installation, it is necessary to determine where a machine center position of the surveying instrument (hereinafter referred as "machine reference point") is positioned in space coordinates with respect to the reference point.

Conventionally, leveling is performed so that the surveying instrument is in vertical direction based on a leveling device incorporated in the surveying instrument. An operator looks in a centripetal telescope under a condition where the surveying instrument is made to stand vertically, and is set in such a manner than the reference point becomes the center of the centripetal telescope. That is, the surveying instrument is installed so that the machine reference point is positioned on a vertical line, which passes through the reference point, and the position on a horizontal plane is coincided with the reference point. After the installation, by actual measurement of a distance from the machine reference point to the reference point using a tape measure or the like, a position of the machine reference point with respect to the reference point is measured.

However, in a case of the conventional method, it is necessary at the same time to make the surveying instrument stand vertically and to perform positioning of the machine reference point and the reference point on the horizontal plane, and operations are necessary such as setting an installation position of a tripod and an installation surface of a surveying instrument main unit in a horizontal position. Further, on a ground surface such as soil and the like, which is soft and where the tripod sink in, there is a case where more time is required to set up the surveying instrument, and since the operator performs measurement by handwork with regard to the height of the machine reference point using a tape measured and the like, there is a possibility that an error occurs.

Further, instead of the operator looking in the centripetal telescope, there is a method which emit a laser beam in a vertically downward direction of the machine reference point and perform positioning on the horizontal plane of the machine reference point and the reference point by projecting the laser beam on the reference point. However, even in this case, it is necessary at the same time to make the surveying instrument stand vertically and to perform positioning of the machine reference point and the reference point on the horizontal plane, and has a similar problem to that of a case where the centripetal telescope is used.

SUMMARY OF THE INVENTION

It is an object of the present invention to provide a surveying instrument and a method to install the surveying instrument, which can be easily installed at a reference point and which improves a working efficiency.

To attain the object as described above, a surveying instrument according to the present invention comprises a surveying instrument main unit having a machine reference point already known, a telescope unit installed on the surveying instrument main unit and for sighting a measuring point, a leveling unit for leveling the surveying instrument main unit, a laser pointer projecting unit for projecting a laser pointer beam in a downward direction along a vertical axis of the surveying instrument main unit and for performing distance measurement, a rotation driving unit for rotating the telescope unit in a direction as desired, a horizontal angle detecting unit for detecting a horizontal angle of the surveying instrument main unit, a vertical angle detecting unit for detecting a vertical angle of the telescope unit, a tilt angle detecting unit for detecting a tilt angle of the surveying instrument main unit, and a control device, wherein the control device calculates relative space coordinates of the machine reference point of the surveying instrument main unit with respect to a projecting point of the laser pointer beam based on a distance measurement value obtained by the laser pointer projecting unit and on a tilt angle at the time of distance measurement.

Further, in the surveying instrument according to the present invention, a tilt adjusting amount by the leveling unit is detected by the tilt angle detecting unit and wherein the control device corrects space coordinates of the machine reference point based on the tilt adjusting amount.

Further, in the surveying instrument according to the present invention, the control device corrects space coordinates of the machine reference point based on an amount of change between a detection value of the tilt angle detecting unit before leveling by the leveling unit and a detection value of the tilt angle detecting unit after leveling, and on a tilting direction as detected by the horizontal angle detecting unit.

Further, in the surveying instrument according to the present invention, the laser pointer projecting unit is installed on the telescope unit and projects the laser pointer beam from the laser pointer projecting unit in a downward direction angle along the vertical axis.

Furthermore, in a method to install a surveying instrument according to the present invention, the method comprises a step of approximately installing a surveying instrument on a reference point, a step of projecting a laser pointer beam on a vertical axis of the surveying instrument by a laser pointer projecting unit, a step of making a projecting point of the laser pointer beam coincide with the reference point by tilting the surveying instrument, a step of measuring a distance between the reference point and a machine reference point of the surveying instrument by the laser pointer projecting unit and calculating relative space coordinates of the machine reference point with respect to the reference point based on distance measurement results and a tilt angle of the surveying instrument at the time of distance measurement, a step of leveling the surveying instrument by a leveling unit, and a step of correcting the space coordinates based on a tilt adjusting amount by the leveling unit an the time of leveling.

According to the present invention, the surveying instrument comprises a surveying instrument main unit having a machine reference point already known, a telescope unit installed on the surveying instrument main unit and for sighting a measuring point, a leveling unit for leveling the surveying instrument main unit, a laser pointer projecting unit for projecting a laser pointer beam in a downward direction along a vertical axis of the surveying instrument main unit and for performing distance measurement, a rotation driving unit for rotating the telescope unit in a direction as desired, a horizontal angle detecting unit for detecting a horizontal angle of the surveying instrument main unit, a vertical angle detecting unit for detecting a vertical angle of the telescope unit, a tilt angle detecting unit for detecting a tilt angle of the surveying instrument main unit, and a control device, wherein the control device calculates relative space coordinates of the machine reference point of the surveying instrument main unit with respect to a projecting point of the laser pointer beam based on a distance measurement value obtained by the laser pointer projecting unit and on a tilt angle at the time of distance measurement. As a result, the measurement of the machine reference point with respect to a reference point can be automatically performed by simply making the projecting point of the laser pointer beam coincide with the predetermined reference point, space coordinates of the machine reference point with respect to the reference point can be automatically determined. This makes it possible to shorten a time required for the installation of the surveying instrument and to improve working efficiency.

Further, according to the present invention, in the surveying instrument, a tilt adjusting amount by the leveling unit is detected by the tilt angle detecting unit and wherein the control device corrects space coordinates of the machine reference point based on the tilt adjusting amount. As a result, a moving amount and a moving direction of the machine reference point at the time of leveling can be accurately detected and space coordinates of the machine reference point after the leveling can be accurately obtained.

Further, according to the present invention, in the surveying instrument, the control device corrects space coordinates of the machine reference point based on an amount of change between a detection value of the tilt angle detecting unit before leveling by the leveling unit and a detection value of the tilt angle detecting unit after leveling, and on a tilting direction as detected by the horizontal angle detecting unit. As a result, a moving amount of the machine reference point at the time of leveling can be accurately detected and space coordinates of the machine reference point after leveling can be accurately obtained.

Further, according to the present invention, in the surveying instrument, the laser pointer projecting unit is installed on the telescope unit and projects the laser pointer beam from the laser pointer projecting unit in a downward direction angle along the vertical axis. As a result, there is no need to separately provide a distance measuring mechanism in order to obtain relative space coordinates of the machine reference point with respect to the projecting point of the laser pointer beam, and this contributes to decreasing of manufacturing cost.

Furthermore, according to the present invention, in a method to install a surveying instrument, the method comprises a step of approximately installing a surveying instrument on a reference point, a step of projecting a laser pointer beam on a vertical axis of the surveying instrument by a laser pointer projecting unit, a step of making a projecting point of the laser pointer beam coincide with the reference point by tilting the surveying instrument, a step of measuring a distance between the reference point and a machine reference point of the surveying instrument by the laser pointer projecting unit and calculating relative space coordinates of the machine reference point with respect to the reference point based on distance measurement results and a tilt angle of the surveying instrument at the time of distance measurement, a step of leveling the surveying instrument by a leveling unit, and a step of correcting the space coordinates based on a tilt adjusting amount by the leveling unit at the time of leveling. As a result, there is no need to perform positioning on a horizontal plane of the machine reference point and the reference position at the time of installation. Also, there is no need to strictly install the machine reference point vertically on the reference point, and this contributes to shortening of working time and improvement of working efficiency.

DETAILED DESCRIPTION OF THE PREFERRED EMBODIMENT

Description will be given below on embodiments of the present invention by referring to the attached drawings.

Figure 1:
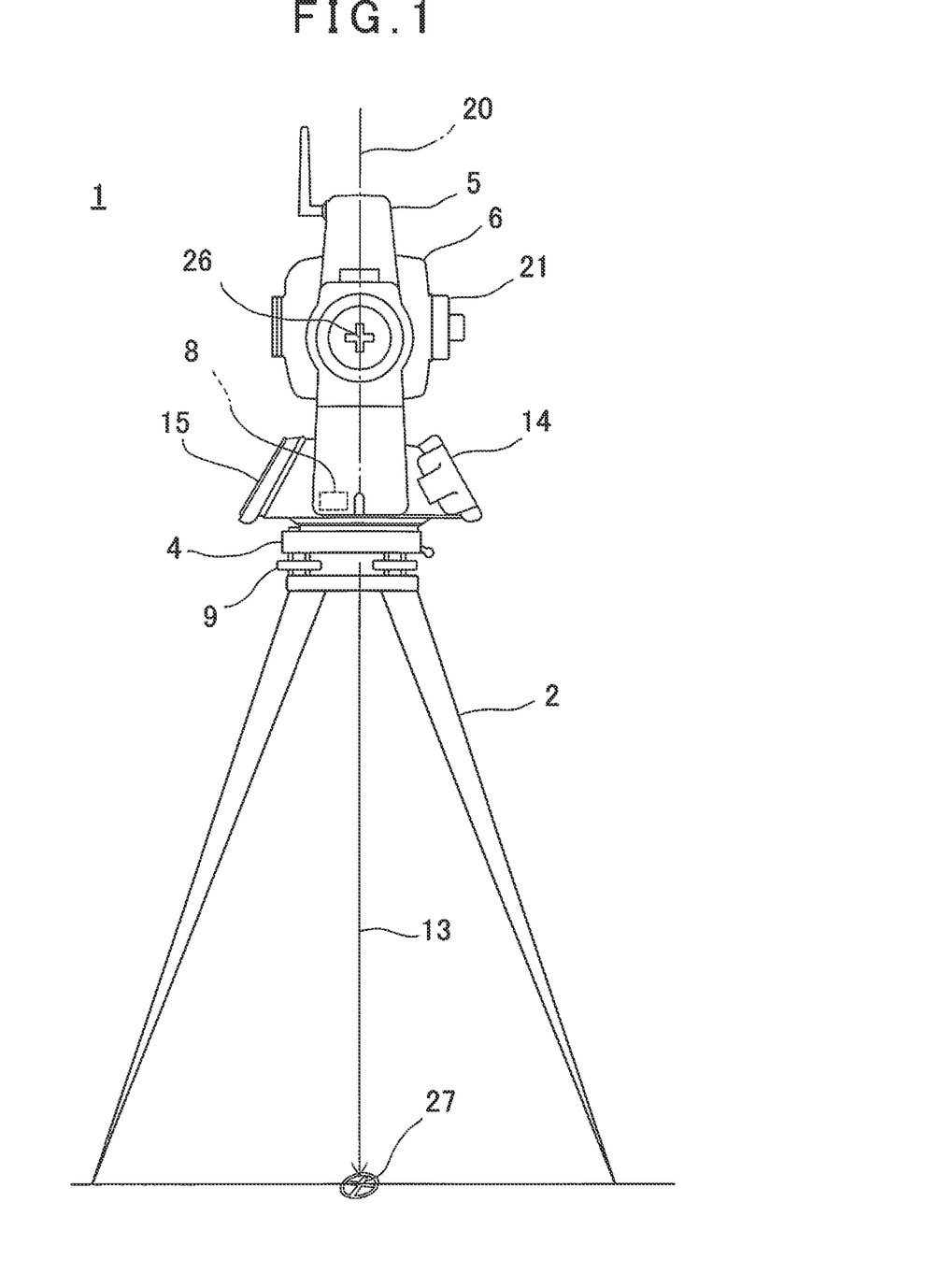
FIG. 1 is a schematical side view of a surveying instrument according to an embodiment of the present invention.
Figure 2:
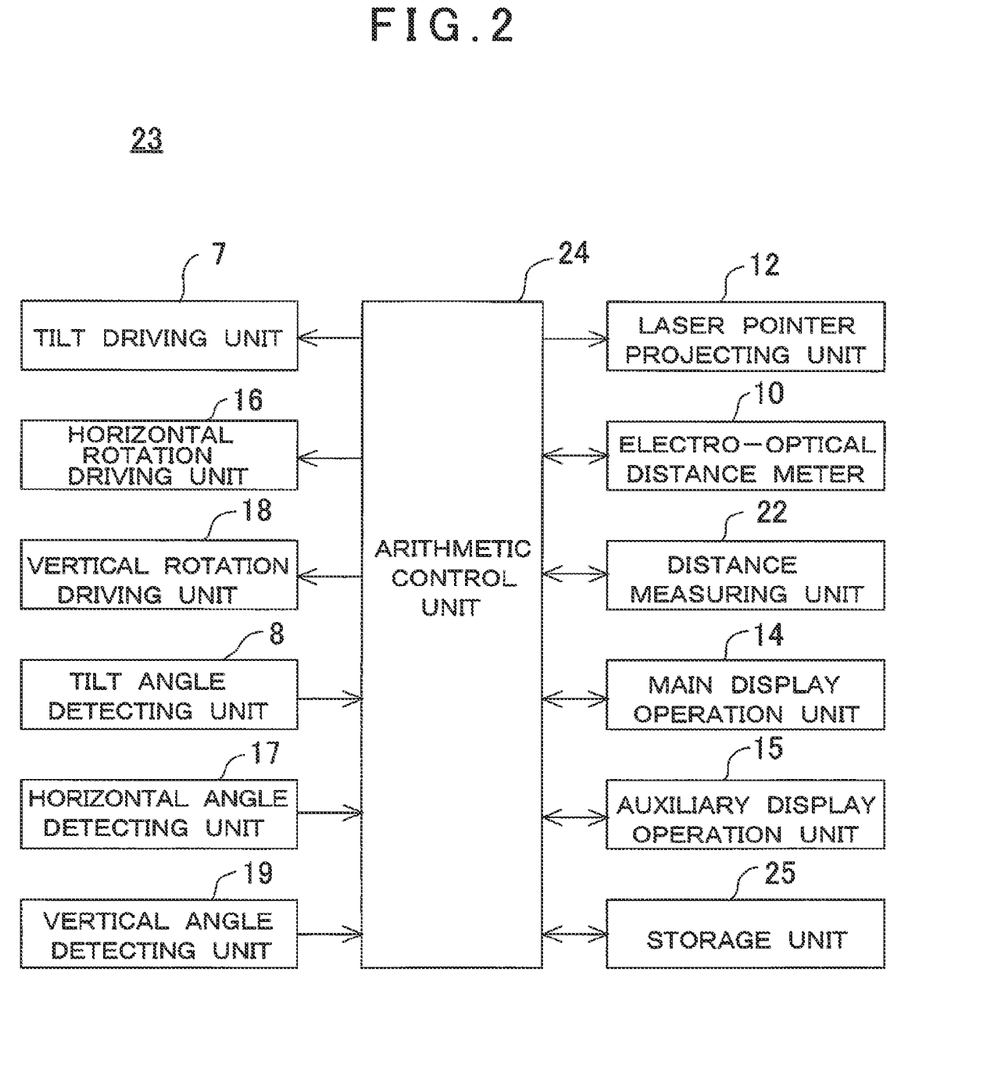
FIG. 2 is a block diagram of a control device of the surveying instrument.

First, referring to FIG. 1 and FIG. 2, a description will be given on a surveying instrument according to an embodiment of the present invention.

A surveying instrument 1 is a total station, for instance, and primarily comprises a tripod 2, a leveling unit 9 mounted on the tripod 2, a base unit 4 provided on the leveling unit 9, a frame unit 5 rotatably provided on she base unit 4 around a vertical axis 20 as the center and a telescope unit 6 rotatably provided on the frame unit 5 with a horizontal axis as the center. A machine reference point 26 of the surveying instrument 1 is positioned on the vertical axis 20.

The tripod 2 is designed so as so be expandable by manual operation. Further, the leveling unit 9 has a tilt angle detecting unit 8, such as a tilt sensor for detecting a tilt angle of the frame unit 5, a tilt driving unit 7 for tilting the frame unit 5 and for leveling the frame unit 5 in horizontal position according to a detection result of the tilt angle detecting unit 8, and an electro-optical distance meter (EDM) 10.

The electro-optical distance meter 10 emits a laser beam of visible light as a distance measuring light, and can perform a non-prism distance measurement. Further, the electro-optical distance meter 10 has a laser pointer projecting unit 12 which is so arranged to project a laser pointer beam 13 of visible light along the vertical axis 20. It is to be noted that the distance measuring light projected from the electro-optical distance meter 10 may be simultaneously used as the laser pointer beam 13, and the laser pointer projecting unit 12 may be omitted.

An optical axis of the laser pointer beam 13 coincides with a distance measuring optical axis (sighting optical axis) of the electro-optical distance meter 10. Further, a relation between the machine reference point 26, which is at an intersection point of the vertical axis 20 and a horizontal axis, and an optical axis of the electro-optical distance meter 10 is already known. Further, as shown in FIG. 4B, the tilt angle detecting unit 8 can detect a tilt angle θ in a plane, which includes the vertical axis 20 and a distance measuring optical axis.

The frame unit 5 has a main display operation unit 14 provided on an ocular lens (not shown) side of the telescope unit 6, and an auxiliary display operation unit 15 provided on an objective lens (not shown) side of the telescope unit 6. Operating, displaying of results, etc. of the surveying instrument 1 can be carried out from any of the main display operation unit 14 and the auxiliary display operation unit 15.

Further, on the frame unit 5, a horizontal rotation driving unit 16 is provided to rotate the frame unit 5 in a horizontal direction around the vertical axis 20 as the center, and a horizontal angle detecting unit 17 for detecting a horizontal angle with respect to the base unit 4 of the frame unit 5 and for detecting a horizontal angle in a sighting direction is provided. Further, on the frame unit 5, a vertical rotation driving unit 18 for rotating the telescope unit 6 around the horizontal axis as the center is provided and a vertical angle detecting unit 19 for detecting a vertical angle of the telescope unit 6 and for performing angle measurement of a vertical angle in a sighting direction is provided.

The tilt driving unit 7 has a function as a laser pointer guiding unit. The laser pointer guiding unit can guide the projecting point of the laser pointer beam 13 to a position as desired by tilting of the frame unit 5 by the tilt driving unit 7.

The horizontal rotation driving unit 16 and the vertical rotation driving unit 18 make up together a rotation driving unit. By cooperative operation of the horizontal rotation driving unit 16 and the vertical rotation driving unit 18, the rotation driving unit can direct the telescope unit 6 to a direction as desired.

The telescope unit 6 is provided with a sighting telescope 21. The sighting telescope 21 has a view angle of about 5° and is to sight a measuring point. It is so arranged that a sighting point of the sighting telescope 21 is indicated by a reticule (not shown) provided on the sighting telescope 21, for instance.

Further, the telescope unit 6 has a distance measuring unit 22 and the distance measuring unit 22 also functions as a laser pointer projecting unit. The distance measuring unit 22 is capable of performing a non-prism distance measurement, and it is so arranged that the distance measuring unit 22 projects a laser beam of visible light as a distance measuring light and a laser pointer beam.

Further, inside the frame unit 5, a control device 23 is provided. It is to be noted that if there is room, the control device 23 may be provided at other site such as the telescope unit 6 and the like.

The control device 23 is arranged so as to control the tilt driving unit 7, the horizontal rotation driving unit 16 and the vertical rotation driving unit 18, to control distance measuring operation by the electro-optical distance meter 10 and the distance measuring unit 22, to control the laser pointer projecting unit 12, to measure a tilt angle, a horizontal angle and a vertical angle based on detection results of the tilt angle detecting unit 8, the horizontal angle detecting unit 17 and the vertical angle detecting unit 19, and to perform correction of space coordinates based on detection results of the tilt angle detecting unit 8. Is it to be noted than she base unit 4, she frame unit 5, the telescope unit 6, etc. make up together a surveying instrument main unit.

Further description will be given on the control device 23.

The control device 23 primarily comprises an arithmetic control unit 24, a storage unit 25, the tilt angle detecting unit 8, the horizontal angle detecting unit 17, the vertical angle detecting unit 19, the main display operation unit 14, the auxiliary display operation unit 15, the electro-optical distance meter 10, the distance measuring unit 22, the tilt driving unit 7, the horizontal rotation driving unit 16, the vertical rotation driving unit 18, etc.

The arithmetic control unit 24 controls the electro-optical distance meter 10 and the distance measuring unit 22. Distance measurement results as measured by the electro-optical distance meter 10 and the distance measuring unit 22 are inputted to the arithmetic control unit 24.

Further, the arithmetic control unit 24 controls the tilt driving unit 7 and projects the laser pointer beam 13 to a position as required by tilting the frame unit 5. A tilt angle detected by the tilt angle detecting unit 8 and a horizontal angle detected by the horizontal angle detecting unit 17, i.e. a tilting direction of the frame unit 5, are inputted to the arithmetic control unit 24. Based on the detection results of the tilt angle detecting unit 8 and the horizontal angle detecting unit 17 and the distance measurement results of the electro-optical distance meter 10, the arithmetic control unit 24 calculates relative space coordinates of the machine reference point 26 (see FIG. 1) with respect to the projecting point of the laser pointer beam 13.

Further, the arithmetic control unit 24 makes the tilt driving unit 7 to tilt the frame unit 5 and to perform horizontal leveling and the like, and controls an installation posture of the surveying instrument 1. At the time of controlling the installation posture of the surveying instrument 1, a tilt adjusting amount by the tilt driving unit 7 as detected by the tilt angle detecting unit 8 is inputted to the arithmetic control unit 24. Based on a detection result of the tilt angle detecting unit 8, the arithmetic control unit 24 calculates a moving direction and a moving amount of the machine reference point 26 and corrects space coordinates of the machine reference point 26.

Further, the arithmetic control unit 24 controls the horizontal rotation driving unit 16 and the vertical rotation driving unit 18 and rotates the telescope unit 6 in a direction as required (a direction of a measuring point). Detection results from the horizontal angle detecting unit 17 and the vertical angle detecting unit 19 are inputted to the arithmetic control unit 24. Based on the detection results from the horizontal angle detecting unit 17 and the vertical angle detecting unit 19, a rotation angle in a horizontal direction and a rotation angle in a vertical direction of the telescope unit 6 are determined by the arithmetic control unit 24.

Various programs are stored in the storage unit 25. These programs include: a control program necessary for controlling the electro-optical distance meter 10, the distance measuring unit 22, the tilt driving unit 7, the horizontal rotation driving unit 16 and the vertical rotation driving unit 18, a relative position calculating program for calculating relative space coordinates of the machine reference point 26 with respect to the projecting point of the laser pointer beam 13 based on the detection results of the tilt angle detecting unit 8 and the horizontal angle detecting unit 17 and on the distance measurement results of the electro-optical distance meter 10, a leveling program for performing automatic leveling of the surveying instrument 1, a correction program or correcting space coordinates of the machine reference point 26 based on a tilt adjusting amount by the tilt driving unit 7 at the time of performing automatic leveling, an angle measuring program for measuring a tilt angle, a horizontal angle, a vertical angle, etc. based on detection results from the tilt angle detecting unit 8, the horizontal angle detecting unit 17 and the vertical angle detecting unit 19, and other programs. Further, measurement data such as distance measurement results and angle measurement results and the like by the electro-optical distance meter 10 and the distance measuring unit 22 are stored in the storage unit 25.

When measurement is performed by the surveying instrument 1, a leveling is carried out so that the surveying instrument 1 (the vertical axis 20) is vertical. Further, it is necessary to install in such a manner that space coordinates of the machine reference point 26 at this moment is already known.

Figure 4A:
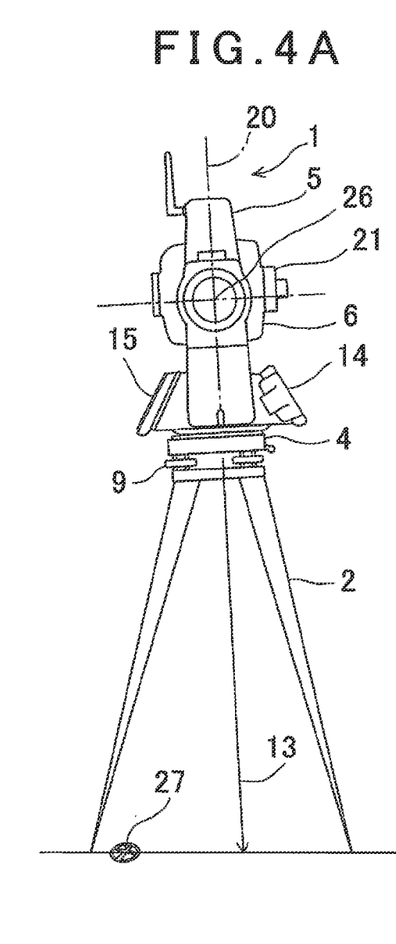
FIG. 4A, FIG. 4B and FIG. 4C are schematical side views to explain a measurement of a machine reference point with respect to a reference point according to an embodiment of the present invention.
Figure 4B:
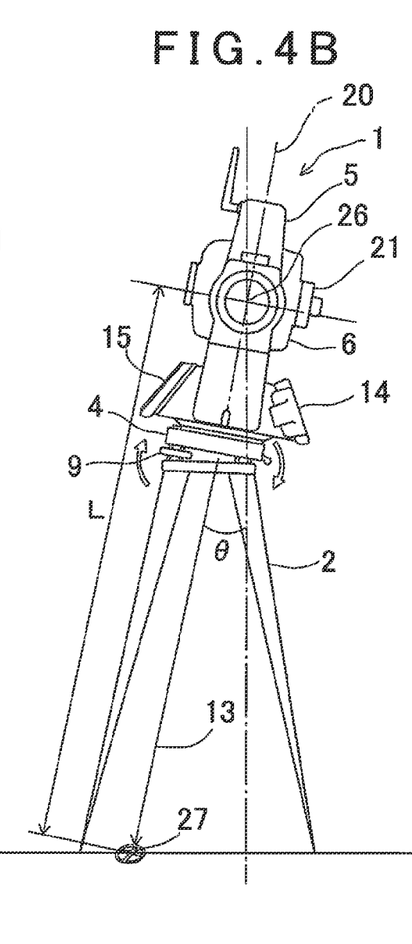

First, as shown in FIG. 4A, the surveying instrument 1 is installed approximately on a reference point 27, which has space coordinates already known (X, Y, Z). Under a condition where the laser pointer beam 13 is projected from the laser pointer projecting unit 12, the frame unit 5 is tilted and the projecting point of the laser pointer beam 13 is coincided with the reference point 27.

Figure 5:
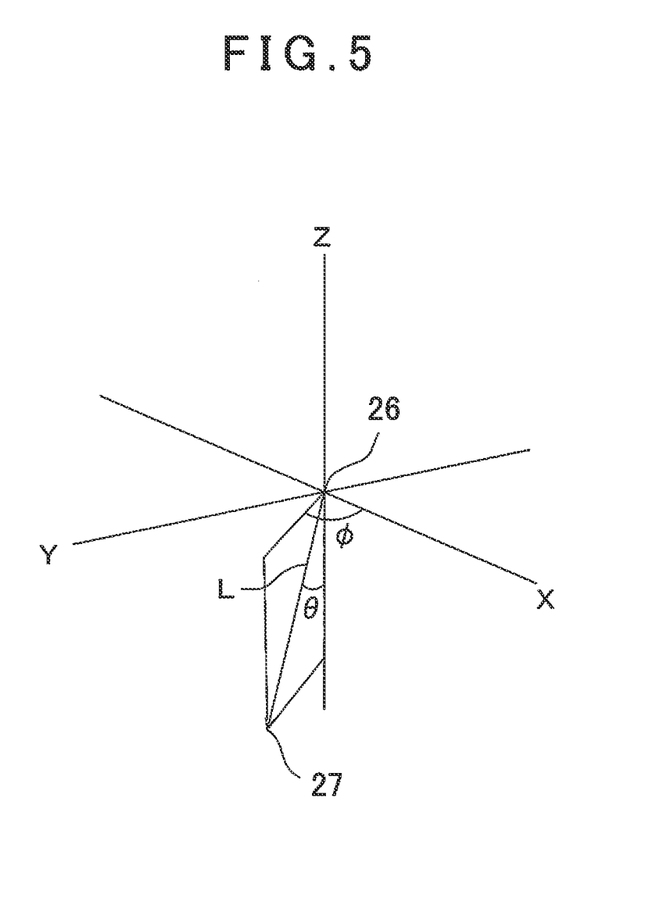
FIG. 5 is an explanatory drawing to explain relative space coordinates of a machine reference point with respect to a reference point.

Under this condition, as shown in FIG. 4B, a distance L from the machine reference point 26 to the reference point 27 is measured by making the electro-optical distance meter 10 perform distance measurement. Further, as shown in FIG. 5, tilt angles ($\theta x$, $\theta y$) are detected by the tilt angle detecting unit 8 at this moment, and based on the tilt angles ($\theta x$, $\theta y$), a horizontal angle $\phi$ of a tilting direction, i.e. a tilting direction of the frame unit 5, is calculated, and a tilt angle $\theta$ in the direction of the horizontal angle $\phi$ is calculated. By using the distance L, the tilt angle $\theta$ and the horizontal angle $\phi$, a relative position of the machine reference point 26 with respect to the reference point 27, i.e. space coordinates (X', Y', Z'), can be obtained.

Figure 4C:
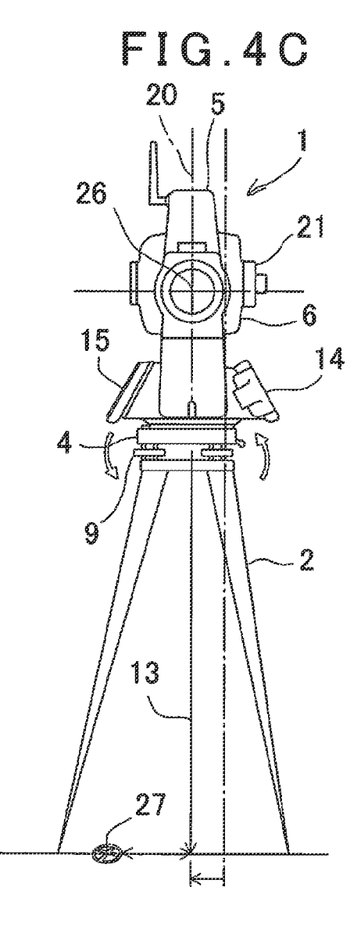

Further, as shown in FIG. 4C, automatic leveling is performed by the control device 23, and the moving direction and the moving amount of the machine reference point 26 are calculated based on the tilt adjusting amount of the tilt driving unit 7 as detected by the tilt angle detecting unit 8. By correcting the space coordinates (X', Y', Z') of the machine reference point 26 based on a calculation result, the space coordinates (X", Y", Z") of the machine reference point 26 after the completion of the leveling of the surveying instrument 1 are obtained, and the installation of the surveying instrument 1 is completed.

After the installation is completed, the frame unit 5 is rotated horizontally by the horizontal rotation driving unit 16 and the telescope unit 6 is rotated vertically by the vertical rotation driving unit 18, and the telescope unit 6 is sighted to a measuring point as desired. Then, a distance measurement with respect to the measuring point is carried out by the distance measuring unit 22, and a distance measurement value can be obtained. Further, a horizontal angle and a vertical angle at the moment of distance measurement is measured by the horizontal angle detecting unit 17 and the vertical angle detecting unit 19, and an angle measurement value can be obtained.

Next, referring to the flowchart of FIG. 3, FIG. 4A to FIG. 4C and FIG. 5, a description will be given on measurement of space coordinates of the machine reference point 26 with respect to the reference point 27.

Figure 3:
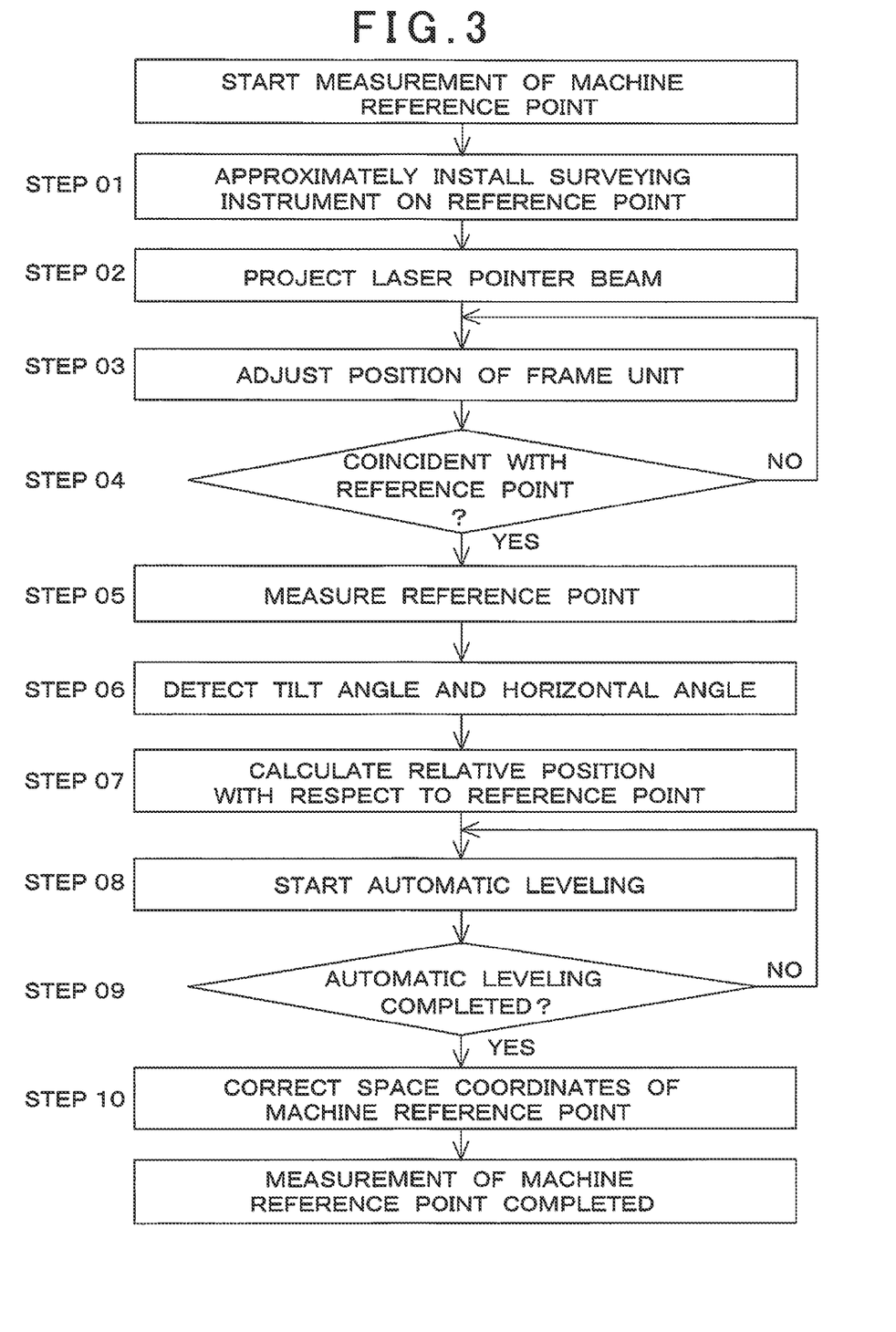
FIG. 3 is a flowchart to explain a measurement of a machine reference point with respect to a reference point according to an embodiment of the present invention.

(Step 01) First of all, the surveying instrument 1 is installed at an approximate position on the reference point 27 where a reference point pile or the like is driven. At this time, as shown in FIG. 4A, positions of the machine reference point 26 and the reference point 27 on a horizontal plane are not coincided, and the vertical axis 20 of the surveying instrument 1 is also slightly tilted with respect to a ground surface.

(Step 02) After the surveying instrument 1 has been approximately installed, the control device 23 makes the laser pointer projecting unit 12 operate and makes the laser pointer projecting unit 12 project the laser pointer beam 13.

(Step 03) Next, the frame unit 5 is tilted, and the projecting point of the laser pointer beam 13 is adjusted automatically by the control device 23. In a case where the tilting of the frame unit 5 is carried out automatically by the control device 23, an operator carries out the tilting of the frame unit 5 via the main display operation unit 14, the auxiliary display operation unit 15, or a remote control device such as tablet, smart phone, etc. (not shown), while directly watching the projecting point of the laser pointer beam 13. It is to be noted that a tilting rotation of the frame unit 5 may be carried out manually.

(Step 04) The projecting point of the laser pointer beam 13 is adjusted so as to coincide with the reference point 27, and it is judged whether or not the projecting point of the laser pointer beam 13 coincides with the reference point 27. In a case where it is judged that the projecting point of the laser pointer beam 13 is not coincided with the reference point 27, an adjustment of the projecting point of the laser pointer beam 13 as described in Step 03 is performed again.

(Step 05) In a case where it is judged in Step 04 that the projecting point of the laser pointer beam 13 is coincided with the reference point 27, as shown in FIG. 4B, the electro-optical distance meter 10 is operated by the control device 23, the electro-optical distance meter 10 carries out distance measurement of the reference point 27, and a distance L from the machine reference point 26 to the reference point 27 is obtained. In this case, a distance between the machine reference point 26 and the electro-optical distance meter 10 is already known. Therefore, by carrying out distance measurement of to the reference point 27 by the electro-optical distance meter 10, a distance L from the machine reference point 26 to the reference point 27 can be obtained.

(Step 06) Further, a the same time as the distance measurement of the reference point 27, the tilt angles ($\theta x$, $\theta y$) is detected by the tilt angle detecting unit 8. Further, a horizontal angle $\phi$ in a tilting direction is calculated based on the tilt angles ($\theta x$, $\theta y$) and a tilt angle $\theta$ in the direction of horizontal angle $\phi$ is calculated. It is to be noted that in a case where a tilting direction is coincident with a sighting direction of the telescope unit 6, a horizontal angle in the sighting direction as detected by the horizontal angle detecting unit 17 may be used as the horizontal angle $\phi$.

(Step 07) The distance L is determined in Step 05 and Step 06, and the tilt angle $\theta$ and the horizontal angle $\phi$ are detected. Next, the control device 23 calculates a relative position, i.e. space coordinates (X', Y', Z'), of the machine reference point 26 with respect to the reference point 27 (space coordinates (X, Y, Z) as already known) based on the distance L, the tilt angle $\theta$ and the horizontal angle $\phi$.

(Step 08 and Step 09) When space coordinates (X', Z') are obtained, next, the control device 23 controls the tilt driving unit 7, and as shown in FIG. 4C, the frame unit 5 is leveled in a horizontal position by the tilt driving unit 7.

(Step 10) Tilt adjusting amount by the tilt driving unit 7 at the time of automatic leveling is detected by the tilt angle detecting unit 8. Based on the tilt adjusting amount by the tilt driving unit 7, the control device 23 calculates a moving amount and a moving direction of the machine reference point 26. Further, the control unit 23 corrects space coordinates (X', Y', Z') based on the moving amount and the moving direction. By the correction, space coordinates (X", Y", Z") of the machine reference point 26 after the leveling with respect to the reference point 27 is obtained, and the measurement of the machine reference point 26 with respect no the reference point 27 is completed. By the completion of the measurement of the machine reference point 26, the machine reference point 26 becomes already known, and the installation of the surveying instrument 1 is completed.

After the installation of the surveying instrument 1 is completed, predetermined processing such as distance measurement, angle measurement, etc. with respect to the measuring point as desired can be carried out.

As described above, in the present embodiment, it would suffice that the surveying instrument 1 is installed at an approximate position on the reference point 27 when the surveying instrument 1 is installed. Therefore, there is no need to perform position alignment of the machine reference point 26 and the reference point 27 on a horizontal plane. Also, there is no need to install the machine reference point 26 strictly on a vertical line of the reference point 27, and contributes to the shortening of operation time and the improvement of working efficiency.

Further, in the present embodiment, by simply coinciding the projecting point of the laser pointer beam 13 with the reference point 27 either manually or automatically after the surveying instrument 1 has been installed approximately, a leveling of the surveying instrument 1 and a measurement of the machine reference point 26 with respect to the reference point 27 can be performed automatically. Therefore, it is possible to automatically obtain space coordinates of the machine reference point 26 with respect to the reference point 27, and contributes to the improvement of working efficiency.

Further, in the present embodiment, a tilt adjusting amount of the tilt driving unit 7 at the time of leveling is detected by the tilt angle detecting unit 8, a moving direction and a moving amount of the machine reference point 26 are calculated based on the tilt adjusting amount as detected, and space coordinates are corrected. Therefore, space coordinates of the machine reference point 26 with respect to the reference point 27 after the leveling can be obtained accurately.

Further, as for the adjustment of the projecting point of the laser pointer beam 13, the operator can perform alignment to the reference point 27 while directly watching the projecting point of the laser pointer beam 13. Therefore, the adjustment of the projecting point of the laser pointer beam 13 can be carried out sensuously, which contributes to the improvement of the working efficiency.

Further, it may be so designed that a laser pointer beam and a distance measuring light as projected by the distance measuring unit 22 are divided, and the laser pointer beam and the distance measuring light as divided are projected in a downward direction along the vertical axis 20 of the surveying instrument 1, and the distance measurement with respect to the reference point can be performed by the distance measuring unit 22. In this case, the electro-optical distance meter 10 and the laser pointer projecting unit 12 may be omitted, which contributes to the decrease of the manufacturing cost.

Further, in the present embodiment, the correction of space coordinates of the machine reference point 26 after the leveling is performed based on the tilt adjusting amount by the tilt driving unit 7 at the time of leveling, while it is needless to say, that the correction of space coordinates of the machine reference point 26 may be performed based on the amount of change from the detection value between the tilt angle detecting unit 8 before the leveling and the detection value of the tilt angle detecting unit 8 after the leveling, and the tilting direction as detected by the horizontal angle detecting unit 17.

Further, in the present embodiment, although a total station is used as the surveying instrument 1, a 3D laser scanner device may be used as the surveying instrument 1. In a case where the 3D laser scanner device is used, the electro-optical distance meter 10 may be omitted if the distance measuring optical axis deflected in a downward direction by a mirror is made to coincide with the vertical axis 20.

The invention claimed is:

1. A surveying instrument, comprising a surveying instrument main unit having a machine reference point already known, a telescope unit installed on said surveying instrument main unit and for sighting a measuring point, a leveling unit for leveling said surveying instrument main unit, a laser pointer projecting unit for projecting a laser pointer beam in a downward direction along a vertical axis of said surveying instrument main unit and for performing distance measurement, a rotation driving unit for rotating said telescope unit in a direction as desired, a horizontal angle detecting unit for detecting a horizontal angle of said surveying instrument main unit, a vertical angle detecting unit for detecting a vertical angle of said telescope unit, a tilt angle detecting unit for detecting a tilt angle of said surveying instrument main unit, and a control device, wherein said control device calculates relative space coordinates of said machine reference point of said surveying instrument main unit with respect to a projecting point of said laser pointer beam based on a distance measurement value obtained by said laser pointer projecting unit and on a tilt angle at the time of distance measurement.

2. A surveying instrument according to claim 1, wherein a tilt adjusting amount by said leveling unit is detected by said tilt angle detecting unit and wherein said control device corrects space coordinates of said machine reference point based on said tilt adjusting amount.

3. A surveying instrument according to claim 2, wherein said laser pointer projecting unit is installed on said telescope unit and projects said laser pointer beam from said laser pointer projecting unit in a downward direction angle along said vertical axis.

4. A surveying instrument according to claim 1, wherein said control device corrects space coordinates of said machine reference point based on an amount of change between a detection value of said tilt angle detecting unit before leveling by said leveling unit and a detection value of said tilt angle detecting unit after leveling, and on a tilting direction as detected by said horizontal angle detecting unit.

5. A surveying instrument according to claim 4, wherein said laser pointer projecting unit is installed on said telescope unit and projects said laser pointer beam from said laser pointer projecting unit in a downward direction angle along said vertical axis.

6. A surveying instrument according to claim 1, wherein said laser pointer projecting unit is installed on said telescope unit and projects said laser pointer beam from said laser pointer projecting unit in a downward direction angle along said vertical axis.

7. A method to install a surveying instrument, wherein said method comprises a step of approximately installing a surveying instrument on a reference point, a step of projecting a laser pointer beam on a vertical axis of said surveying instrument by a laser pointer projecting unit, a step of making a projecting point of said laser pointer beam coincide with said reference point by tilting said surveying instrument, a step of measuring a distance between said reference point and a machine reference point of said surveying instrument by said laser pointer projecting unit and calculating relative space coordinates of said machine reference point with respect to said reference point based on distance measurement results and a tilt angle of said surveying instrument at the time of distance measurement, a step of leveling said surveying instrument by a leveling unit, and a step of correcting said space coordinates based on a tilt adjusting amount by said leveling unit at the time of leveling.

* * * * *